United States Patent
Helbing et al.

(10) Patent No.: US 6,811,328 B2
(45) Date of Patent: Nov. 2, 2004

(54) OPTICAL FIBER SPLICING USING SURFACE TENSION

(75) Inventors: Rene P. Helbing, Palo Alto, CA (US); Annette Grot, Cupertino, CA (US); Fred Sugihwo, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 204 days.

(21) Appl. No.: 10/156,215

(22) Filed: May 28, 2002

(65) Prior Publication Data

US 2003/0223710 A1 Dec. 4, 2003

(51) Int. Cl.⁷ .............................................. G02B 6/255
(52) U.S. Cl. .......................................... 385/95; 385/50
(58) Field of Search .............................. 385/50, 95–99; 156/158, 278, 296

(56) References Cited

U.S. PATENT DOCUMENTS

| | | | |
|---|---|---|---|
| 3,928,102 A | | 12/1975 | Rowe et al. .............. 385/50 X |
| 4,948,219 A | * | 8/1990 | Seino et al. .................. 385/95 |
| 6,012,856 A | * | 1/2000 | Kim et al. ..................... 385/99 |

FOREIGN PATENT DOCUMENTS

| | | |
|---|---|---|
| EP | 1031861 A2 | 8/2000 |
| EP | 1072564 A1 | 1/2001 |

OTHER PUBLICATIONS

Sato, Kaiji Hata Seiichi and Shimokohbe, Akira, "Self–alignment for Microparts Assembly Using Water Surface Tension," Precision and Intelligence Laboratory, Tokyo Institute of Technology 4259 Nagatsuta, Midori–ku, Yokohama, 226·8503 Japan.

Quinby, Eric, S., "The Longevity and Use of Index Matching Gel in the UniCam Connector and the CamSplice Mechanical Splice," Issue Date: Mar. 1, 2000.

* cited by examiner

Primary Examiner—Phan T. H. Palmer

(57) ABSTRACT

Optical systems that include optical fiber splices are provided. Such an optical system includes first and second optical fibers, each of which has an end surface and a side surface adjacent to the end surface. An adhesive joins the end surface of the first optical fiber to the end surface of the second optical fiber. Additionally, at least a portion of the end surface of the first optical fiber exhibits a wettability for the adhesive that is higher than a wettability for the adhesive exhibited by at least a portion of the side surface of the first optical fiber. Methods and other systems also are provided.

20 Claims, 5 Drawing Sheets

OPTICAL FIBER SPLICING USING SURFACE TENSION

FIELD OF THE INVENTION

The present invention generally relates to optical communications and, more particularly, to systems and methods for splicing optical fibers.

DESCRIPTION OF THE RELATED ART

A fiber optic splice is a permanent fiber joint for establishing an optical connection between two optical fibers. Certain system designs require that optical connections exhibit specific optical properties, e.g., low loss, that are met only by fiber optic splices. Fiber optic splices also permit repair of optical fibers that are damaged during installation, for example.

To form a fiber optic splice, the optical fibers being spliced are actively and/or passively aligned. Active alignment typically includes monitoring the signal loss of an optical signal propagating from one optical fiber, through the splice, and to the other optical fiber. By monitoring the signal loss, the optical fibers can be accurately aligned, i.e., when signal loss is minimized, proper alignment is achieved. Although active alignment procedures are capable of producing low-loss fiber optic splices, these procedures generally are considered time-consuming and expensive, as they typically require the use of a power meter or optical time-domain reflector.

In another active alignment procedure, precision reference surfaces are used to align the optical fibers during splicing. For example, U.S. Pat. No. 3,928,102 to Rowe et al., which is incorporated herein by reference, discloses a method for joining two optical fibers in which both are held parallel to a reference surface by surface tension of a liquid. In particular, the liquid is spread on a work table upon which the fibers are placed. The optical fibers are held against the work table by surface tension of the liquid along the lengths of the optical fibers. Alignment is achieved by transmitting light along one fiber and rotating the other until the intensity of the light received attains a maximum. The optical fibers then are joined at their ends by the application of an adhesive or heat. Clearly, this technique requires the use of a reference surface and can be messy.

Based on the foregoing, there is a need for improved systems and methods that address these and/or other perceived shortcomings of the prior art. For example, what is needed is a method for splicing optical fibers that is less expensive and time-consuming than those incorporating active alignment.

SUMMARY OF THE INVENTION

The invention involves passive alignment of optical fibers by using surface tension of an adhesive applied at the ends of the fibers. Typically, at least one of the fibers includes a surface, proximate to an end of the fiber, that exhibits low wettability with respect to the adhesive. When the adhesive is applied to the end of the fiber, the adhesive tends to locate itself at the end surface, i.e., the adhesive does not spread out along the adjacent side surface of the fiber. Therefore, when the end of the other fiber contacts the adhesive, surface tension of the adhesive passively aligns the fibers. Since the adhesive is optically transparent, light can propagate from one fiber to the other via the adhesive. In some embodiments, a cladding material can be applied to the adhesive to form a cladded optical waveguide between the fibers.

A representative embodiment of an optical system in accordance with the invention includes first and second optical fibers, each of which has an end surface and a side surface adjacent to the end surface. An adhesive joins the end surface of the first optical fiber to the end surface of the second optical fiber. Additionally, at least a portion of the end surface of the first optical fiber exhibits a wettability for the adhesive that is higher than a wettability for the adhesive exhibited by at least a portion of the side surface of the first optical fiber.

Methods for splicing a pair of optical fibers also are provided. One such method includes: providing first and second optical fibers, each of which has an end surface; applying adhesive to the end surface of the first optical fiber; positioning the first and second optical fibers so that the adhesive extends between the end surface of the first optical fiber and the end surface of the second optical fiber; and aligning the first and second optical fibers using surface tension of the adhesive.

Clearly, some embodiments of the invention may address shortcomings of the prior art in addition to, or in lieu of, those described here. Additionally, other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

As will be described in detail here, the invention uses the surface tension of an adhesive to align two optical fibers. Surface tension is a characteristic of liquids that causes the surface of a liquid to behave much like an elastic sheet. More specifically, surface tension causes liquid to take on a shape exhibiting the smallest surface area. For example, surface tension causes a droplet to take on the shape of a sphere.

Surface tension of a liquid is caused by the molecules at the surface of the liquid experiencing only inward attractive forces from other molecules of the liquid, while interior molecules of the liquid are attracted in all directions. Since the outward attractive forces from molecules, e.g., air or vapor molecules, surrounding the liquid typically are weaker than the attractive forces of the molecules of the liquid, the molecules at the surface of the liquid tend to behave like an elastic skin.

When a liquid is in contact with a solid, the attractive force between the molecules of the solid and the liquid may be stronger than that between the molecules of the liquid themselves. For example, this attractive force ("adhesion tension") can cause the free surface of a contained liquid to form a curved surface ("meniscus") with respect to the container. Related to adhesion tension is the term "wettability," which refers to the relative affinity of liquid for the surface of a solid. Wettability increases directly with increasing affinity, as is typically characterized by the contact angle formed between a droplet of the liquid and a horizontally oriented surface of the solid, upon which the droplet is placed. Wettability increases from non-wettability, at contact angles greater than 90 degrees, to complete wettability, at a contact angle of 0 degrees.

Note, for typical single and multi-mode fibers, the exterior dimensions of the fibers usually are controlled well enough to allow alignment using the outer dimensions of the fibers as a reference. Because of this, passive alignment of two fibers can be achieved by using adhesive arranged at the end of one of the optical fibers for aligning that end with the end of the other optical fiber. In some embodiments, restricting the adhesive to the end surfaces of the optical fibers is considered advantageous. For instance, if the adhesive is permitted to contact surfaces located adjacent to the end faces of the optical fibers, the surface tension caused by the adhesive may tend to misalign the optical fibers. More specifically, if the adhesive spreads to an adjacent side surface of an optical fiber, the adhesive may tend to draw the other optical fiber toward that side surface.

Figure 1:
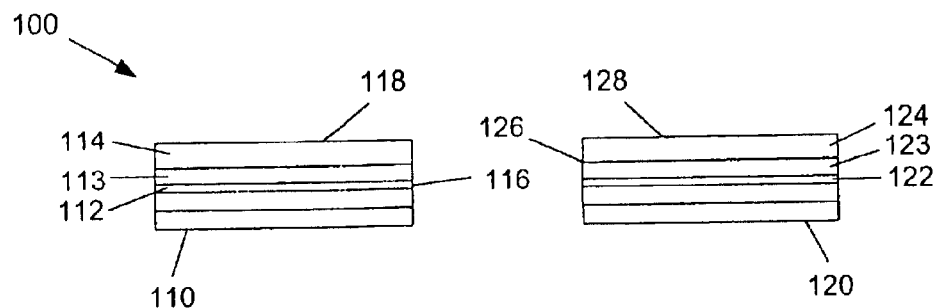
FIG. 1 is a schematic, side cross-sectional view of two optical fibers that are to be spliced in accordance with an embodiment of a method of the present invention.
Figure 2:
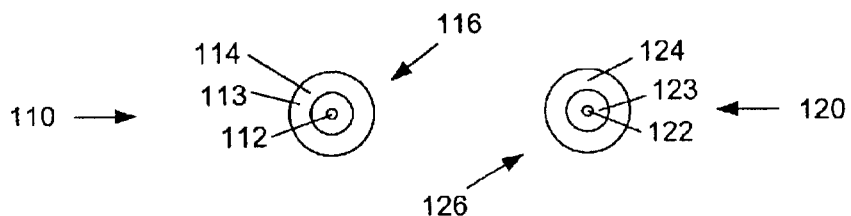
FIG. 2 depicts schematic, end views of the optical fibers of FIG. 1.

Referring now to the drawings, FIGS. 1 and 2 are schematic, side cross-sectional and end views, respectively, of two optical fibers of an optical system 100. In particular, optical fibers 110 and 120 are to be spliced in accordance with an embodiment of a method of the present invention. In FIGS. 1 and 2, optical fiber 110 includes a core 112, a cladding layer 113 and a jacket layer 114 surrounding the cladding layer. Similarly, optical fiber 120 includes a core 122, a cladding layer 123 and a jacket layer 124 that defines an exterior surface. The exterior surface of each of the optical fibers includes an end surface and another surface arranged adjacent to the end surface. More specifically, optical fiber 110 includes an end surface 116 and a side surface 118, while optical fiber 120 includes an end surface 126 and a side surface 128.

Figure 3:
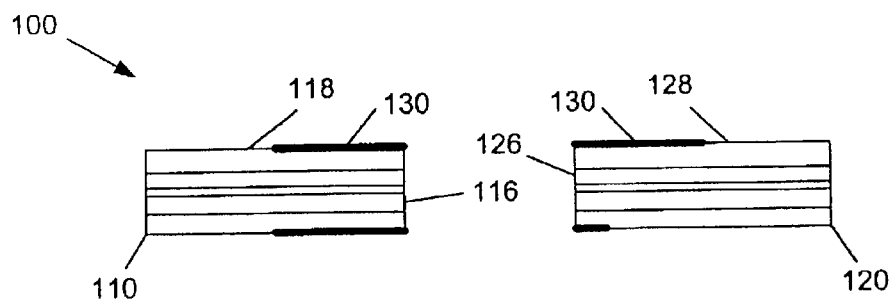
FIG. 3 is a schematic, side cross-sectional view of the optical fibers of FIG. 1 with a low-wettability coating applied to the fibers.
Figure 4:
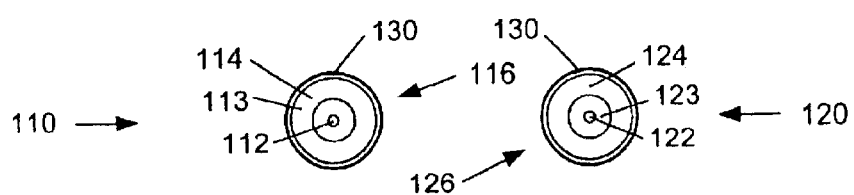
FIG. 4 depicts schematic, end views of the optical fibers of FIG. 3.

Turning to FIGS. 3 and 4, a coating 130 is applied to the side surfaces 118, 128 of the corresponding optical fibers 110 and 120. In particular, the end surfaces 116 and 126 preferably are surrounded by a continuous ring of coating 130 on the corresponding side surfaces 118 and 128. However, in some embodiments, coatings 130 may include discontinuities. Note, the coating 130 of fiber 120 is not symmetric. In particular, the coating does not extend at uniform distances from the end surface about the circumference of the fiber. The shortest distance that the coating extends, however, should be selected to ensure that adhesive applied at the end surface does not bridge the coating and distort the shape of the droplet of adhesive.

Figure 5A:
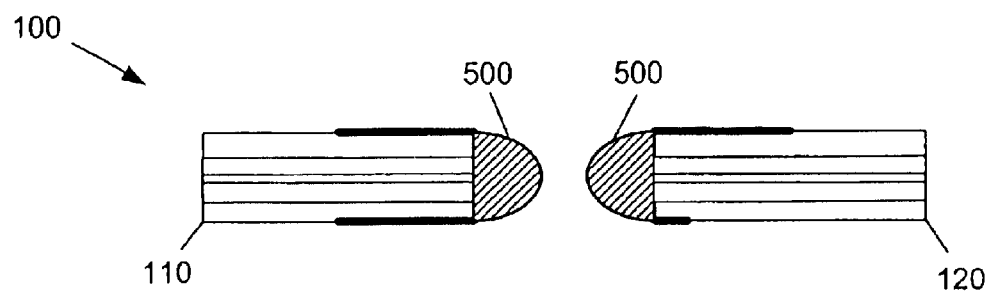
FIGS. 5A–5C are schematic, side cross-sectional views of two optical fibers being spliced in accordance with an embodiment of a method of the present invention.
Figure 5B:
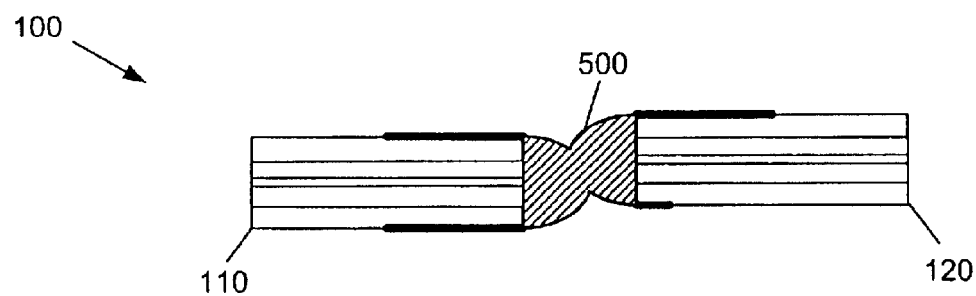
Figure 5C:
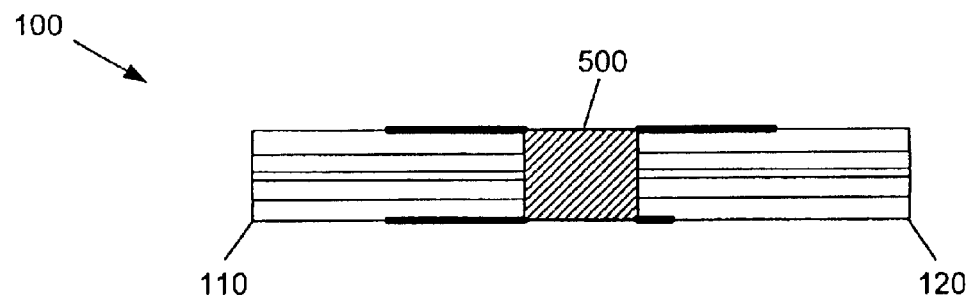

Splicing the optical fibers 110 and 120 using the surface tension of an adhesive is depicted schematically in FIGS. 5A–5C. As shown in FIG. 5A, liquid adhesive 500 is applied to at least one of the end surfaces 116, 126. The adhesive 500 has different characteristics of wettability with respect to the end surfaces 116, 326, and the coating 130. For example, the adhesive 500 may exhibit a first wettability for the end surfaces 116, 126, but a lower wettability for the coating 130. This reduces a tendency of the adhesive to spread from the end surfaces of the optical fibers onto the adjacent side surfaces. In some embodiments, the end surfaces 116 and 126 exhibit complete wettability for the adhesives, while the coating 130 exhibits non-wettability.

The difference in the wettabilities between the end surfaces and the side surfaces of the optical fibers causes the adhesive 500 on the end surfaces 116 and/or 126 to form a stable droplet on the corresponding optical fibers 110 and/or 120. The optical fibers 110 and 120 can then be brought into close proximity to each other so that the droplets are connected as shown in FIG. 5B. Note that misalignment between the cores 112 and 122 may be evident as the optical fibers 110 and 120 are brought together, as shown in FIG. 5B. However, as shown in FIG. 5C, this misalignment can be substantially eliminated by the tendency of the adhesive 500 to minimize its surface area due to the effects of surface tension.

Various types of coating materials and adhesives can be used. By way of example, the coating material can be a metal, such as gold or platinum. The adhesive can be an epoxy or an acrylic. For instance, a UV-curable acrylic could be used.

Figure 6:
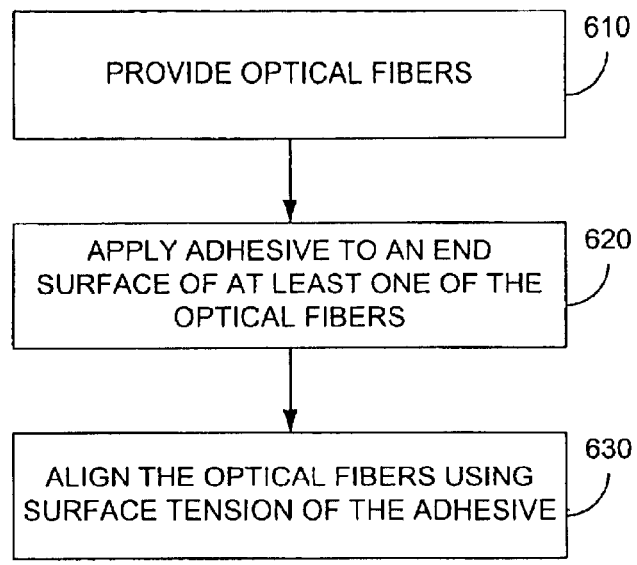
FIG. 6 is a flowchart depicting an embodiment of a method in accordance with the present invention.

FIG. 6 is a flowchart depicting an embodiment of a method 100 in accordance with the present invention that can be used for splicing optical fibers. As shown in FIG. 6, the method may be construed as beginning at block 610, where optical fibers are provided. In block 620, adhesive is applied to an end surface of at least one of the optical fibers. Thereafter, such as depicted in block 630, the optical fibers are aligned using the surface tension of the adhesive.

Figure 7:
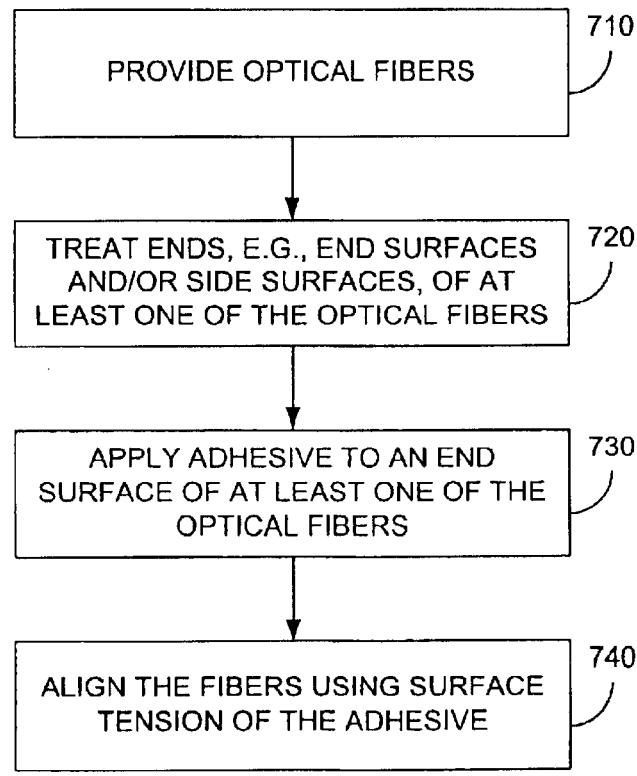
FIG. 7 is a flowchart depicting another embodiment of a method in accordance with the present invention.

In this regard, another embodiment of a method in accordance with the invention is depicted in the flowchart of FIG. 7. As shown in FIG. 7, the method may be construed as beginning at block 710, where optical fibers are provided. In block 720, the ends of the optical fibers that are to be spliced are treated so that the side surfaces of the optical fibers adjacent to the end surfaces exhibit lower wettabilities with respect to an adhesive than the end surfaces. Thereafter, such as depicted in block 730, adhesive is applied to an end surface of at least one of the optical fibers. In block 740, the optical fibers are aligned using the surface tension of the adhesive.

Figure 8:
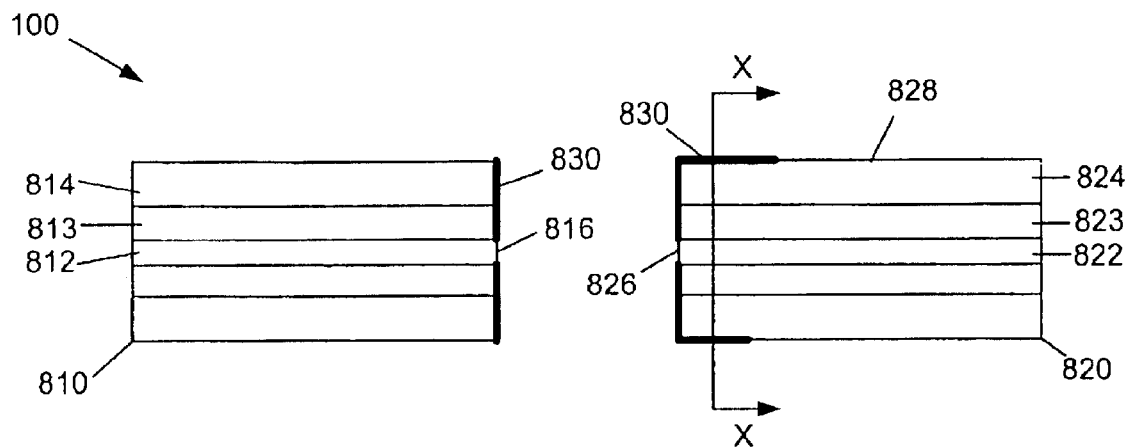
FIG. 8 is a schematic, side cross-sectional view of optical fibers that are to be spliced in accordance with an embodiment of a method of the present invention.

FIG. 8 is a schematic, side cross-sectional view of two other optical fibers 810, 820 that are to be spliced in accordance with the invention. As shown in FIG. 8, and the accompanying end and cross-sectional end views of FIGS. 9 and 10, respectively, the end surfaces 816 and 826 at least partially coated with the coating material 830. More specifically, coating 830 is applied to at least a portion of the end surfaces 816 and 826, so that the cores 812 and 822 are not obstructed. Optical fiber 820 also includes coating material 830 applied to side surface 828.

Figure 9:
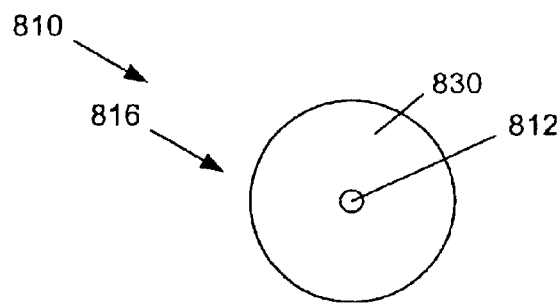
FIG. 9 is a schematic, end view of a first of the optical fibers of FIG. 8.
Figure 10:
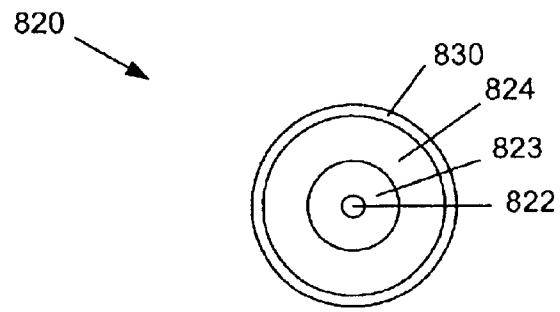
FIG. 10 is a schematic, end cross-sectional view of a second of the optical fibers of FIG. 8, as viewed along section lines X—X of FIG. 8.
Figure 11A:
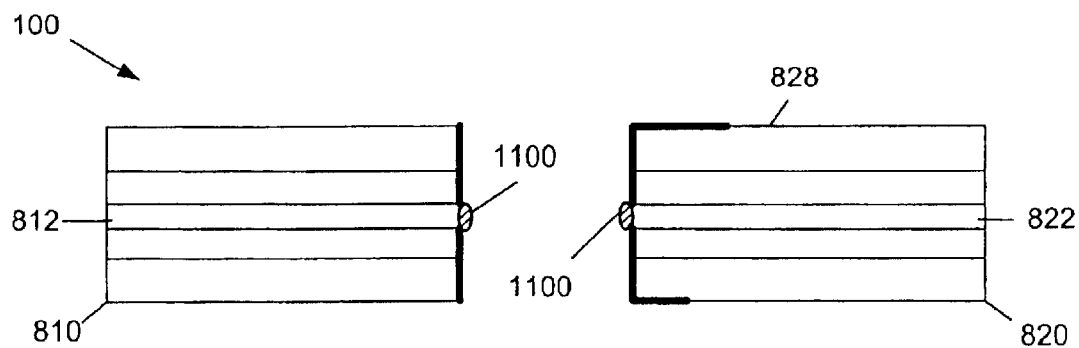
FIGS. 11A–11C are schematic, side cross-sectional views of the optical fibers of FIGS. 8–10 being spliced in accordance with an embodiment of a method of the present invention.
Figure 11B:
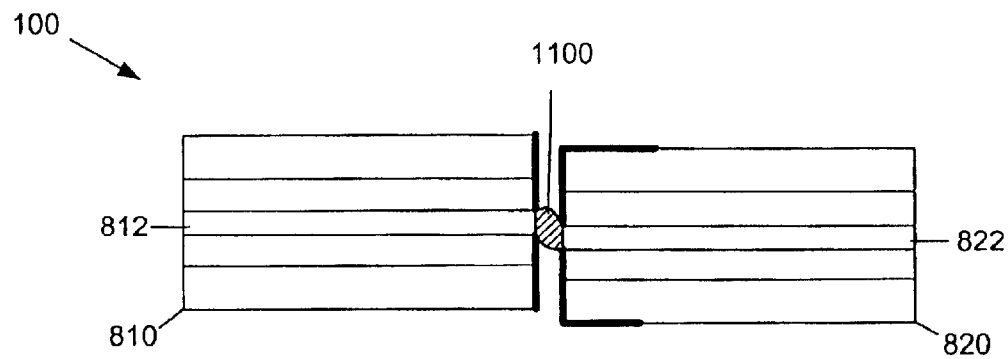
Figure 11C:
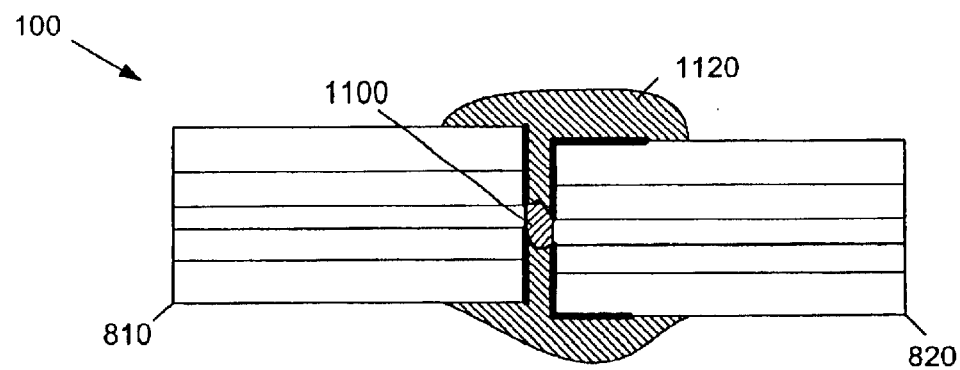

FIGS. 11A–11C are schematic, side cross-sectional views depicting splicing of fibers 810 and 820 of FIGS. 8–10 in accordance with an embodiment of the invention. As shown in FIG. 11A, a drop of adhesive 1100 is applied to the uncoated surface of each of the cores 812 and 822. In FIG. 11B, optical fibers 810 and 820 are positioned so that the adhesive drops merge to form a single drop of adhesive 1100. Note, since the surface area of adhesive 1100 in FIG. 1B should be minimized due to surface tension and should remain minimized after curing, it is expected that degradation of an optical signal propagating between the cores 812 and 822 via the adhesive 1100 also should be minimized.

As described before with respect to FIG. 5B, optical fibers may be slightly misaligned during splicing. As shown in FIG. 1B, and unlike that depicted during the splicing of the fibers in FIGS. 5A–5C, the surface tension of adhesive 1100 may not be adequate for axially aligning optical fibers 810 and 820. In such a case, however, the adhesive 1100 can be used as a waveguide that enables the misaligned optical fibers to communicate optically with each other.

In some embodiments, such as depicted in FIG. 11C, a cladding material 1120 can be applied to the splice, e.g., to the adhesive 1100. Typically, the cladding material 1120 exhibits a lower refractive index than the adhesive 1100. Thus, the adhesive 1100 in combination with the cladding material 1120 creates a connecting waveguide that propagates light between the optical fibers even though the optical fibers 810 and 820 may not be axially aligned with each other. In some embodiments, cladding material 1120 can be an adhesive that is used to provide additional mechanical strength to the splice.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide illustration of the principles of the invention and its practical application to thereby enable one of ordinary skill in the art to utilize the invention in various embodiments and with various modifications as are suited to the particular use contemplated.

By way of example, although the methods described above use coatings to affect the wettability of various surfaces with respect to an adhesive, various other techniques also may be used for controlling wettability. For instance, the core, cladding and/or jacket of an optical fiber can include materials that are chosen in order to provide the appropriate wettabilities with respect to the adhesive used. Similarly, various surface modifications, such as roughing and polishing, also may be used in order to affect the wettability of the various surfaces. Additionally, during splicing, an adhesive may only be applied to the end surface of one of the optical fibers prior to positioning the fibers. All such modifications and variations are within the scope of the invention as determined by the appended claims when interpreted in accordance with the breadth to which they are fairly and legally entitled.

What is claimed is:

1. An optical system comprising:

first and second optical fibers, each of said optical fibers having an end surface and a side surface adjacent to said end surface; and an adhesive joining said end surface of said first optical fiber to said end surface of said second optical fiber;

wherein at least a portion of said end surface of said first optical fiber exhibits a wettability for said adhesive that is higher than a wettability for said adhesive exhibited by at least a portion of said side surface of said first optical fiber.

2. The optical system of claim 1, further comprising:

a coating surrounding at least said portion of said side surface of said first optical fiber, said coating enabling said portion of said side surface of said first optical fiber to exhibit said lower wettability for said adhesive than said portion of said end surface of said first optical fiber.

3. The optical system of claim 2, wherein said coating additionally contacts at least a portion of said end surface of said first optical fiber.

4. The optical system of claim 3, wherein said first optical fiber includes a core, and said coating does not contact said core.

5. The optical system of claim 1, further comprising:

a cladding material at least partially surrounding said adhesive, said cladding material exhibiting a refractive index lower than a refractive index of said adhesive.

6. The optical system of claim 5, wherein said cladding material includes an adhesive.

7. The optical system of claim 1, wherein said portion of said end surface of said first optical fiber exhibits complete wettability for said adhesive.

8. The optical system of claim 1, wherein said portion of said side surface of said first optical fiber exhibits non-wettability for said adhesive.

9. The optical system of claim 1, wherein at least a portion of said end surface of said second optical fiber exhibits a wettability for said adhesive that is higher than a wettability for said adhesive exhibited by at least a portion of said side surface of said second optical fiber.

10. The optical system of claim 1, further comprising:

means for reducing wettability for said adhesive of said portion of said side surface of said first optical fiber.

11. The optical system of claim 1, wherein said end surfaces of said pair of optical fibers are axially aligned with each other.

12. The optical system of claim 1, wherein said adhesive is optically transparent.

13. A method for splicing a pair of optical fibers, comprising:

providing first and second optical fibers, each of said optical fibers having an end surface;

applying adhesive to the end surface of the first optical fiber; and aligning the first and second optical fibers using surface tension of the adhesive.

14. The method of claim 13, wherein the first optical fiber has an exterior surface, at least a first portion of which exhibits a lower wettability with respect to the adhesive than a wettability with respect to the adhesive exhibited by at least a portion of the end surface of the first optical fiber.

15. The method of claim 14, wherein at least a portion of the end of the first optical fiber exhibits complete wettability with respect to the adhesive.

16. The method of claim 14, wherein providing first and second optical fibers comprises:

providing a coating material; and coating the portion of the exterior surface of the first optical fiber that exhibits the lower wettability with respect to the adhesive with the coating material.

17. The method recited in claim 13, further comprising:

applying a cladding material to the exterior surface of the adhesive, the cladding material exhibiting an index of refraction lower than a refractive index of the adhesive.

18. The method of claim 17, further comprising:

propagating an optical signal through the first optical fiber, the adhesive and the second optical fiber.

19. The method of claim 17, wherein the cladding material includes an adhesive.

20. The method of claim 13, wherein aligning the first and second optical fibers comprises:

positioning the first and second optical fibers so that the adhesive extends between the end surface of the first optical fiber and the end surface of the second optical fiber; and releasing the ends of both the first and second optical fibers so that the ends of the optical fibers can be aligned by surface tension of the adhesive.

* * * * *